(12) United States Patent
Law et al.

(10) Patent No.: US 6,961,129 B2
(45) Date of Patent: Nov. 1, 2005

(54) ACTIVE CONTROL OF TWO ORTHOGONAL POLARIZATIONS FOR HETERODYNE INTERFEROMETRY

(75) Inventors: Joanne Y. Law, Sunnyvale, CA (US); Eric S. Johnstone, Redwood City, CA (US); Elizabeth A. Nevis, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 157 days.

(21) Appl. No.: 10/439,970

(22) Filed: May 15, 2003

(65) Prior Publication Data

US 2004/0227942 A1 Nov. 18, 2004

(51) Int. Cl.[7] .................................................. G01B 9/02
(52) U.S. Cl. ........................ 356/493; 356/491; 356/364
(58) Field of Search ................................ 356/364, 368, 356/370, 484, 486, 487, 490, 491, 614, 622

(56) References Cited

U.S. PATENT DOCUMENTS

| | | | | |
|---|---|---|---|---|
| 4,817,206 A | * | 3/1989 | Calvani et al. | ............. 398/152 |
| 4,960,319 A | * | 10/1990 | Dankowych | .................. 385/1 |
| 5,124,828 A | | 6/1992 | Mahon | |
| 5,191,387 A | | 3/1993 | Ichikawa et al. | |
| 5,412,474 A | * | 5/1995 | Reasenberg et al. | ........ 356/486 |
| 5,416,628 A | * | 5/1995 | Betti et al. | .................. 398/185 |
| 5,508,839 A | | 4/1996 | Ono | |
| 5,600,474 A | | 2/1997 | Tomesen et al. | |
| 6,549,283 B2 | | 4/2003 | Eckert | |

OTHER PUBLICATIONS

Reinhold Noé, "Endless Polarization Control Systems for Coherent Optics", Journal of Lightwave Technology, vol. 6, No. 7, Jul. 1988, pp. 1199–1208.

"Endless Polarisation Controller Using Electro–Optic Waveplates", Electronics Letters, Mar. 31st, 1988, vol. 24, No. 7, pp. 412–413.

* cited by examiner

Primary Examiner—Gregory J. Toatley, Jr.
Assistant Examiner—Roy M. Punnoose (57) ABSTRACT

A polarization control system includes a light source that generates two light beams with different polarization states and optical frequencies. A polarization state modulator changes the polarization states of the two light beams. Three detector paths generate a first beat signal, a second beat signal, and a third beat signal from the two light beams. An amplitude detector determines the amplitude of the first beat signal at a beat frequency. A phase comparator determines the phase difference between the second and the third beat signals. The system then uses the amplitude and the phase difference to determine how to adjust the polarization state modulator in order to generate the first and the second light beams with the desired polarization states.

37 Claims, 8 Drawing Sheets

ACTIVE CONTROL OF TWO ORTHOGONAL POLARIZATIONS FOR HETERODYNE INTERFEROMETRY

FIELD OF INVENTION

This invention relates to active control of polarization of a coherent source.

DESCRIPTION OF RELATED ART

Figure 9:
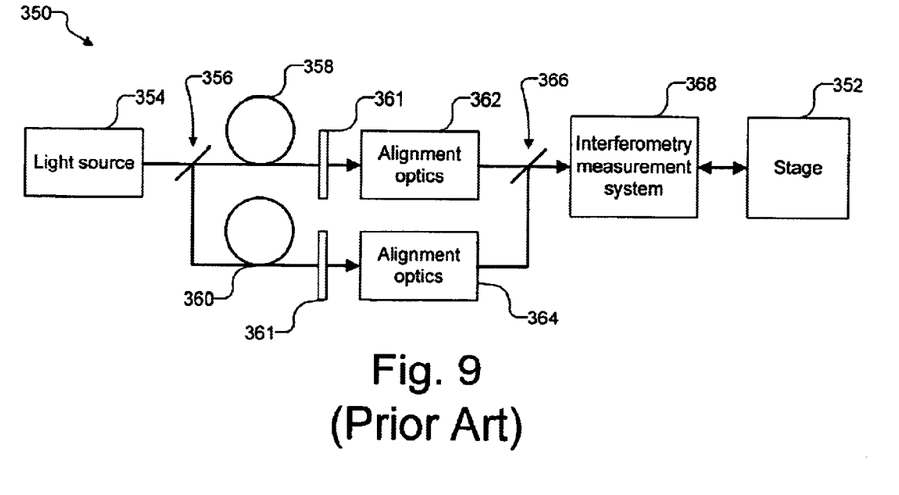
FIG. 9 illustrates a conventional system for detecting the displacement of a stage used in semiconductor fabrication.

FIG. 9 illustrates a conventional system 350 that detects the displacement of a stage 352 used in semiconductor fabrication. A light source 354 generates two light beams with orthogonal polarization states and optical frequencies. A beam splitter 356 feeds one beam to a polarization-maintaining (PM) fiber 358 and the other beam to a PM fiber 360. Fibers 358 and 360 carry the two beams to a site where measurements are taken. By using fibers 358 and 360, light source 354 (e.g., a laser) can be located far enough away from the measurement site so that temperature gradients from light source 354 do not vary the refractive index of the air and cause spurious Doppler shifts in the interferometry measurements. A single PM fiber is not used to carry the two beams because the fiber will change the polarizations too much for the interferometry measurements.

At the measurement site, polarizers 361, alignment optics 362, alignment optics 364, and combiner 366 are used to recombine the two beams so they would travel along a common path. Alignment optics includes collimators, flat transmissive windows, polarizing optics, beam splitters, and total and partial reflectors to translate and tilt the beams. An interferometry measurement system 368 then reflects one of the beams off stage 352 and then detects the phase difference between the two beams to determine a displacement of stage 352.

System 350 has the following disadvantages. First, it is difficult to align optics 362, optics 364, and combiner 366 so the two beams again travel along the same path. Second, it is costly to utilize two fiber paths in which all the equipment are duplicated. Thus, what is needed is a polarization control system that maintains the polarization of two light beams in a single fiber.

SUMMARY

In one embodiment of the invention, a polarization control system includes a light source that generates two light beams with orthogonal polarization states and different optical frequencies. A polarization state modulator changes the polarization states of the two light beams. Three detector paths generate a first beat signal, a second beat signal, and a third beat signal from the two light beams. An amplitude detector is used to determine the amplitude of the first beat signal at a beat frequency. A phase comparator determines the phase difference between the second and the third beat signals. The system then uses the amplitude and the phase difference to determine how to adjust the polarization state modulator in order to generate the first and the second light beams with the desired polarization states.

DETAILED DESCRIPTION

Prior to describing the embodiments of the invention in detail, a few key terms are hereafter defined. A retarder (or wave plate) is an optical device that resolves a light wave into two orthogonal polarization components and produces a phase shift (defined as retardance) between them. The resulting light wave is generally of a different polarization form. All angle orientations of retarders in this document refer to orientation of the slow axis relative to the horizontal axis (x-axis). A variable retarder is a retarder whose retardance can be changed by external means, e.g., by the application of a voltage.

A polarization state modulator (PSM) is a device which converts the input polarization state into an output polarization state. The output polarization state is controlled by one or more external inputs applied to the PSM, e.g., voltage. The output polarization state is different from the input polarization state in general. For example, the PSM can consist of multiple variable retarders.

Figure 1:
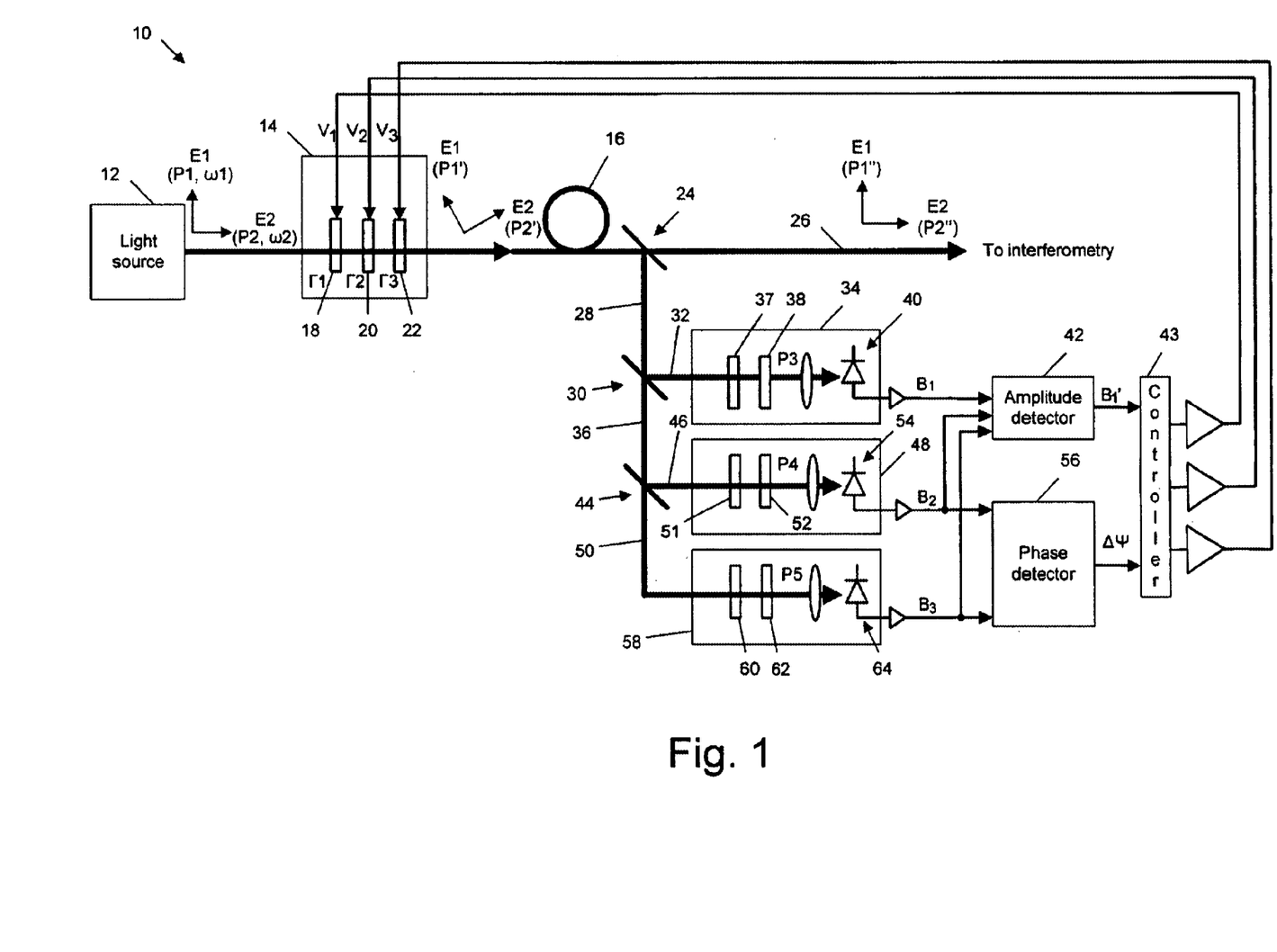
FIG. 1 illustrates a polarization control system for maintaining any polarized states of two orthogonally polarized light beams in one embodiment of the invention.

FIG. 1 illustrates a polarization control system 10 in one embodiment of the invention. System 10 is implemented in a remote operation configuration where the polarization state modulator is located upstream from a fiber that feeds an interferometry system for measuring displacement.

A light source 12 generates (1) a light beam E1 with a polarization state P1 and a frequency $\omega 1$, and (2) a light E2 with a polarization state P2 and a frequency $\omega 2$. In one embodiment, light source 12 includes a Helium Neon (HeNe) laser and electro-optical components required to generate the desired polarizations and frequencies. For example, light source 12 is a 5517D laser made by Agilent Technologies. A voltage-controlled polarization state modulator (PSM) 14 receives light beams E1 and E2 and adjusts their polarization states to P1' and P2', respectively, before launching them into a fiber 16. Voltage-controlled PSM 14 is operable to change any input polarization state to any desired output polarization state. In one embodiment, voltage-controlled PSM 14 includes a voltage-controlled variable retarder 18 oriented at 0°, a voltage-controlled variable retarder 20 oriented at 45°, and a voltage-controlled variable retarder 22 oriented at 0°. Retarders 18, 20, and 22 are controlled by voltages V1, V2, and V3 to generate retardances Γ1, Γ2, and Γ3, respectively.

Fiber 16 carries light beams E1 and E2 downstream to a measurement site. In one embodiment, fiber 16 is a polarization-maintaining (PM) fiber. Experiments show that fiber 16 changes the polarization states of light beams E1 and E2 to P1" and P2", respectively, due to temperature variation, mechanical deformation of the fiber, and mechanical vibration. Nonetheless, fiber 16 produces negligible change to the orthogonal relationship between the polarization states of light beams E1 and E2.

At the measurement site, a beam splitter 24 divides light beams E1 and E2 into two paths. An output path 26 carries light beams E1 and E2 to the distance-measuring interferometry (hereafter "DMI") system. A monitor path 28 carries light beams E1 and E2 to components that monitor and maintain the polarization states of E1 and E2 described hereafter. Some or all of these components can be located either at the measurement site or away from the measurement site. For example, light exiting components 38, 52, and 62 can be each coupled to a multimode fiber in conjunction with a focusing lens leading to the detector components away from the measurement site.

A beam splitter 30 receives light beams E1 and E2 from path 28 and divides them into two paths. A path 32 carries light beams E1 and E2 to a first detector path 34, and a path 36 carries light beams E1 and E2 to other detector paths. First detector path 34 includes a polarizer 38 that allows the components of light beams E1 and E2 at a selected polarization state P3 to reach a light detector 40. A focusing lens may be interposed between polarizer 38 and light detector 40 to focus the light. In response to the light intensity received, light detector 40 transmits a beat signal B1 at a beat tone frequency of ($\omega 1-\omega 2$) to an amplitude-sensing device 42. Beat signal B1 represent the optical power detected. An amplifier may be interposed between light detector 40 and amplitude-sensing device 42 to amplify the beat signal B1. Before polarizer 38, first detector path 34 can optionally include one or more wave plates 37. Wave plates 37 and polarizer 38 are selected according to the desired orientation of the output polarization states of light beams E1 and E2.

A beam splitter 44 receives light beams E1 and E2 from path 36 and divides them into two paths. A path 46 carries light beams E1 and E2 to a second detector path 48, and a path 50 carries light beams E1 and E2 to another detector path. Second detector path 48 includes a polarizer 52 that allows the components of light beams E1 and E2 at a selected polarization state P4 to reach a light detector 54. A focusing lens may be interposed between polarizer 52 and light detector 54. In response to the light intensity received, light detector 54 transmits a beat signal B2 to a phase detector 56. An amplifier may be interposed between light detector 54 and phase detector 56. Before polarizer 52, second detector path 48 optionally includes one or more wave plates 51. Wave plates 51 and polarizer 52 are selected to generate a large beat signal B2 depending on the desired orientation of the output polarizations states of light beams E1 and E2.

Path 50 carries light beams E1 and E2 to a third detector path 58. Third detector path 58 includes a polarizer 62 that allows the components of light beams E1 and E2 at a selected polarization state P5 to reach a light detector 64. A focusing lens may be interposed between polarizer 62 and light detector 64. In response to the light intensity received, light detector 64 transmits a beat signal B3 to phase detector 56. An amplifier may be interposed between light detector 64 and phase detector 56. Before polarizer 62, the third detector path 58 optionally includes one or more wave plates 60. Wave plates 60 and polarizer 62 are selected to generate a beat signal B3 that has a different phase relationship with beat signal B2 for each of the two possible solutions of E1 and E2 corresponding to a minimum amplitude detected by amplitude-sensing device 42 in first detector path 34. In one embodiment, the phase relationship is 90° out of phase (i.e., beat signals B2 and B3 are in quadrature).

Phase detector 56 determines a phase difference $\Delta\Psi$ between beat signals B2 and B3. Amplitude-sensing device 42 determines an amplitude B1' of beat signal B1 at the beat tone frequency (i.e., $\omega 1-\omega 2$). A controller 43 uses amplitude B1' and phase difference $\Delta\Psi$ to generate control voltages which are applied to PSM 14 in order to achieve the desired polarization states of light beams E1 and E2 as they exit fiber 16. Amplifiers may be interposed between controller 43 and PSM 14 to amplify the control signals. Controller 43 can be implemented using analog or digital components.

Specifically, controller 43 adjusts PSM 14 until beat tone amplitude B1' reaches one of two local minimums. If all the orthogonal polarization states of E1 and E2 were applied to the system, it would be found that tone amplitude B1' has two local minimums because the beat tone function has two degenerate solutions that correspond to two possible orientations of E1 and E2. Controller 43 uses phase difference $\Delta\Psi$ to uniquely determine the polarization states of E1 and E2 because the phase difference $\Delta\Psi$ has different values at the two minimums that correspond to the two orientations of E1 and E2. The exact correspondence between the values of phase difference $\Delta\Psi$ and the orientations of E1 and E2 can be derived conventionally using Jones calculus.

Figure 2:
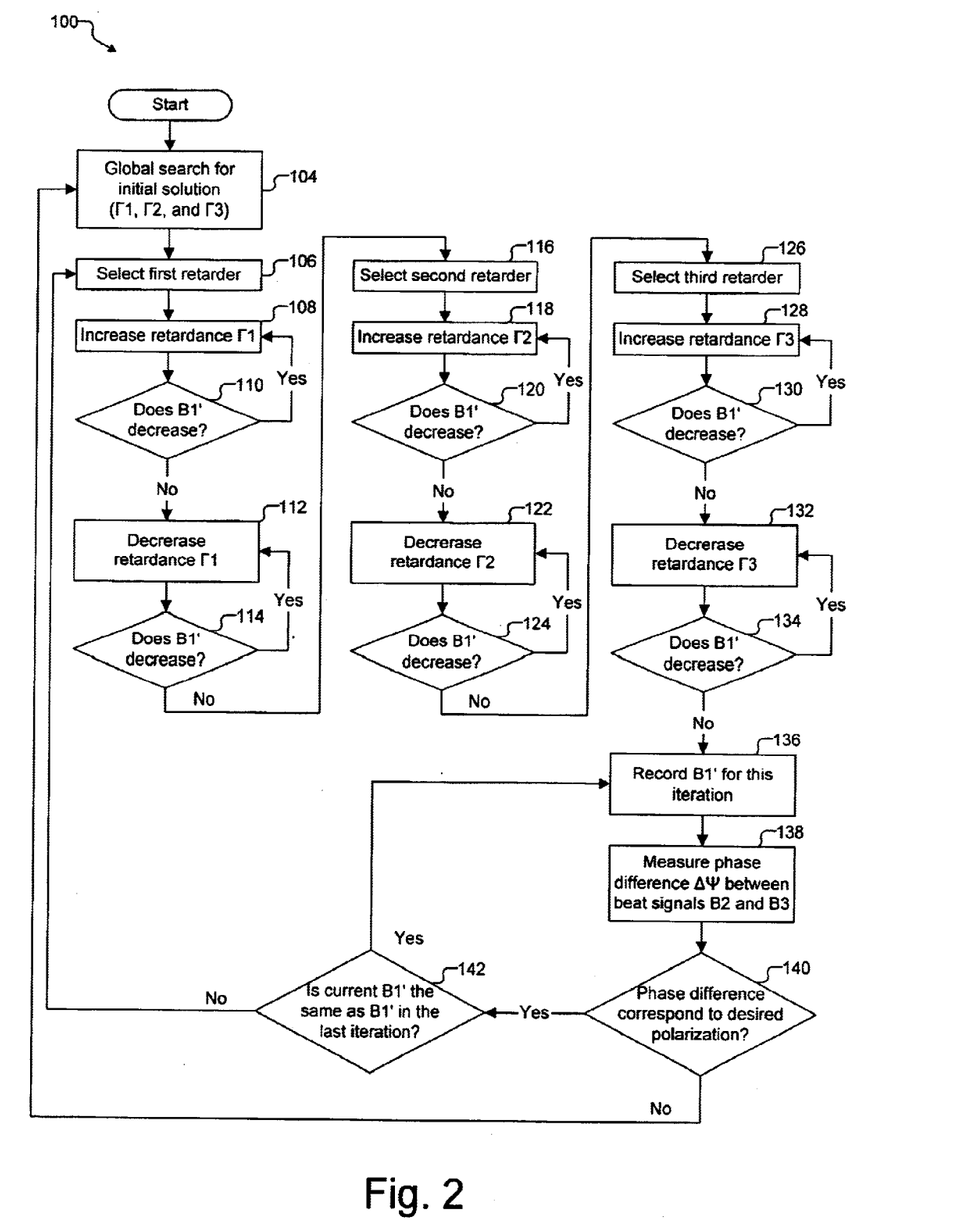
FIGS. 2 and 3 are flowcharts of methods for operating the polarization control system of FIG. 1 in one embodiment of the invention.

FIG. 2 illustrates a method 100 for using system 10 to lock into a desired polarization orientation in one embodiment. In a step 104, controller 43 performs a global search for an initial solution of retardances $\Gamma 1$, $\Gamma 2$, and $\Gamma 3$ that would produce a local minimum with the correct polarization orientation. The values of $\Gamma 1$, $\Gamma 2$, and $\Gamma 3$ in the initial solution are used as the initial retardance values. One embodiment of step 104 is described later in reference to FIG. 3.

In steps 106 to 114, controller 43 adjusts retardance $\Gamma 1$ of retarder 18 to find the minimum value of beat tone amplitude B1' that can be achieved with retardance $\Gamma 1$. Specifically, in step 106, controller 43 selects retarder 18. In step 108, controller 43 increments retardance $\Gamma 1$ by adjusting voltage V1. In step 110, controller 43 determines if beat tone amplitude B1' has decreased. If so, step 110 is followed by step 108. Otherwise step 110 is followed by step 112.

In step 112, controller 43 decrements retardance $\Gamma 1$ by adjusting voltage V1. In step 114, controller 43 determines if beat tone amplitude B1' has decreased. If so, step 114 is followed by step 112. Otherwise step 114 is followed by step 116.

In steps 116 to 124, controller 43 adjusts retardance $\Gamma 2$ of retarder 20 to find the minimum value of beat tone amplitude B1' that can be achieved with retardance $\Gamma 2$. Step 124 is followed by step 126 once the minimum value of beat tone amplitude B1' has been achieved. In steps 126 to 134, controller 43 adjusts retardance $\Gamma 3$ of retarder 22 to find the minimum value of beat tone amplitude B1' that can be achieved with retardance $\Gamma 3$. Step 134 is followed by step 136 once the minimum value of beat tone amplitude B1' has been achieved.

In step 136, controller 43 records the value of beat tone amplitude B1' for the current iteration. In step 138, controller 43 determines phase difference $\Delta\Psi$ between beat signals B2 and B3. In step 140, controller 43 determines if the value of phase difference $\Delta\Psi$ corresponds to the desired output polarization states of E1 and E2. Phase difference $\Delta\Psi$ may not correspond to the desired output polarization states if there is a large and sudden change in the condition of fiber 16 that cause a large and sudden change in the polarization states of E1 and E2, which may cause the control loop to lose lock momentarily, and hence the system may not be locked to the same initial solution thereafter. If so, then step 140 is followed by step 104 where method 100 is repeated to search for another initial solution of retardances Γ1, Γ2, and Γ3. If phase difference ΔΨ corresponds to the desired output polarization states of E1 and E2, then step 140 is followed by step 142.

In step 142, controller 43 determines if the current beat tone amplitude B1' is the same as the beat tone amplitude B1' recorded from the previous iteration. If so, then step 142 is followed by 136 and method 100 loops until the beat tone amplitude B1' changes value. If the current beat tone amplitude B1' is not the same as the beat tone amplitude B1' recorded from the previous iteration, then step 142 is followed by step 106 and method 100 is repeated to search for another minimum beat tone amplitude B1'.

Figure 3:
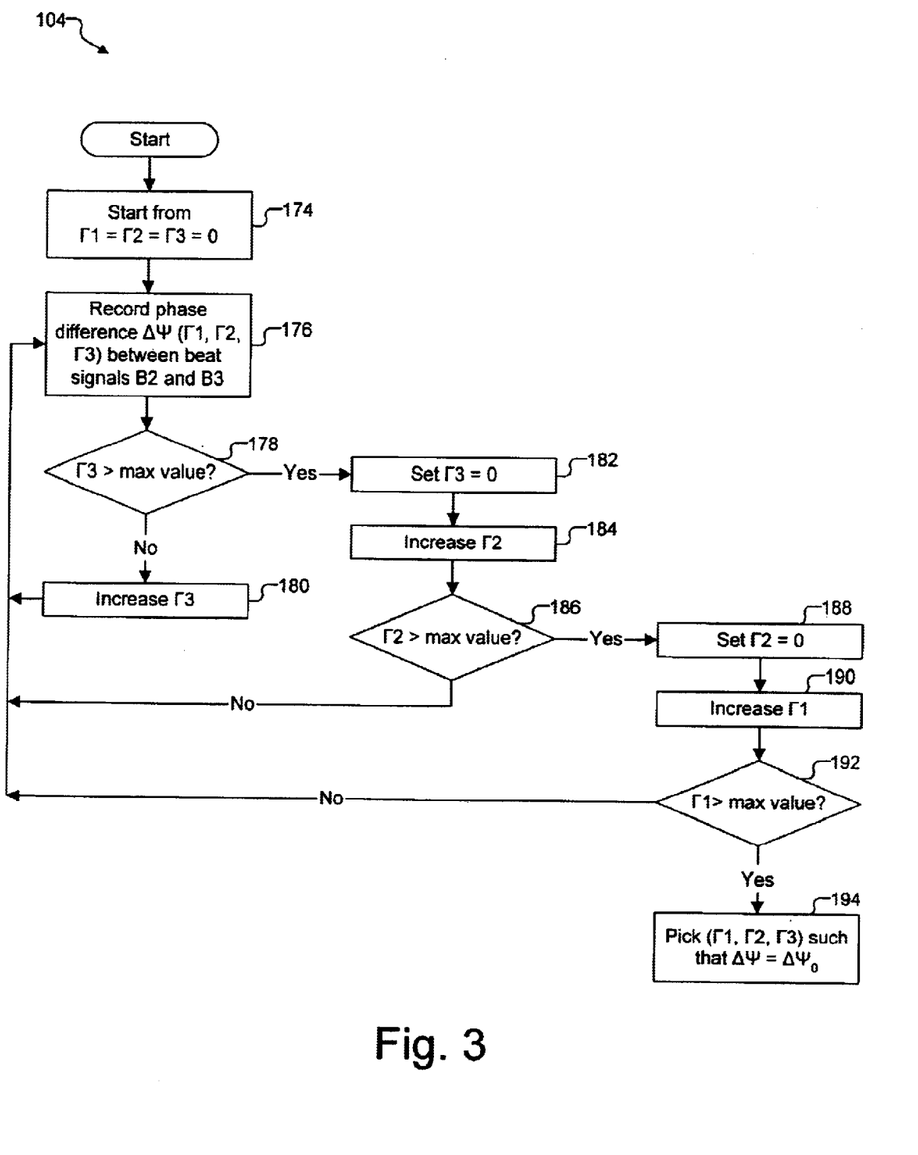

FIG. 3 illustrates one embodiment of step 104 where controller 43 searches through some or all of the polarization states of E1 and E2 for an initial solution of retardances Γ1, Γ2, and Γ3 that produces the desired orientation of the polarization states of E1 and E2. In step 174, controller 43 initializes retardances Γ1, Γ2, and Γ3 to 0. Minimum values of zero retardance are assumed here, but the search can start from any minimum value of retardances Γ1, Γ2, and Γ3 achievable by the retarders or desired to be searched. In step 176, controller 43 records phase difference ΔΨ between beat signals B2 and B3 generated with the current values of retardances Γ1, Γ2, and Γ3. In step 178, controller 43 determines if retardance Γ3 exceeds its maximum value. The maximum value may be the maximum retardance that a retarder can achieve or desired to be searched. If retardance Γ3 exceeds its maximum value, then step 178 is followed by step 182. If retardance Γ3 has not exceeded its maximum value, then step 178 is followed by step 180. In step 180, controller 43 increments retardance Γ3 by adjusting voltage V3. Step 180 is followed by step 176 and the above steps loop until retardance Γ3 exceeds its maximum value.

In step 182, controller 43 reinitializes Γ3 to 0. In step 184, controller 43 increments retardance Γ2 by adjusting voltage V2. In step 186, controller 43 determines if retardance Γ2 exceeds its maximum value. If so, then step 186 is followed by step 188. If retardance Γ2 has not exceeded its maximum value, then step 186 is followed by step 176 and the above steps loop until both retardances Γ3 and Γ2 exceed their maximum values.

In step 188, controller 43 reinitializes Γ2 to 0. In step 190, controller 43 increments retardance Γ1 by adjusting voltage V1. In step 192, controller 43 determines if retardance Γ1 exceeds its maximum value. If so, then step 192 is followed by step 194. If retardance Γ1 has not exceeded its maximum value, then step 192 is followed by step 176 and the above steps loop until retardances Γ3, Γ2, and Γ1 exceed their maximum values. In step 194, controller 43 selects the values of retardances Γ3, Γ2, and Γ1 that produced a desired phase difference $\Delta\Psi_0$, which corresponds to the desired output polarization states of E1 and E2, as the initial solution for method 100.

Figure 4:
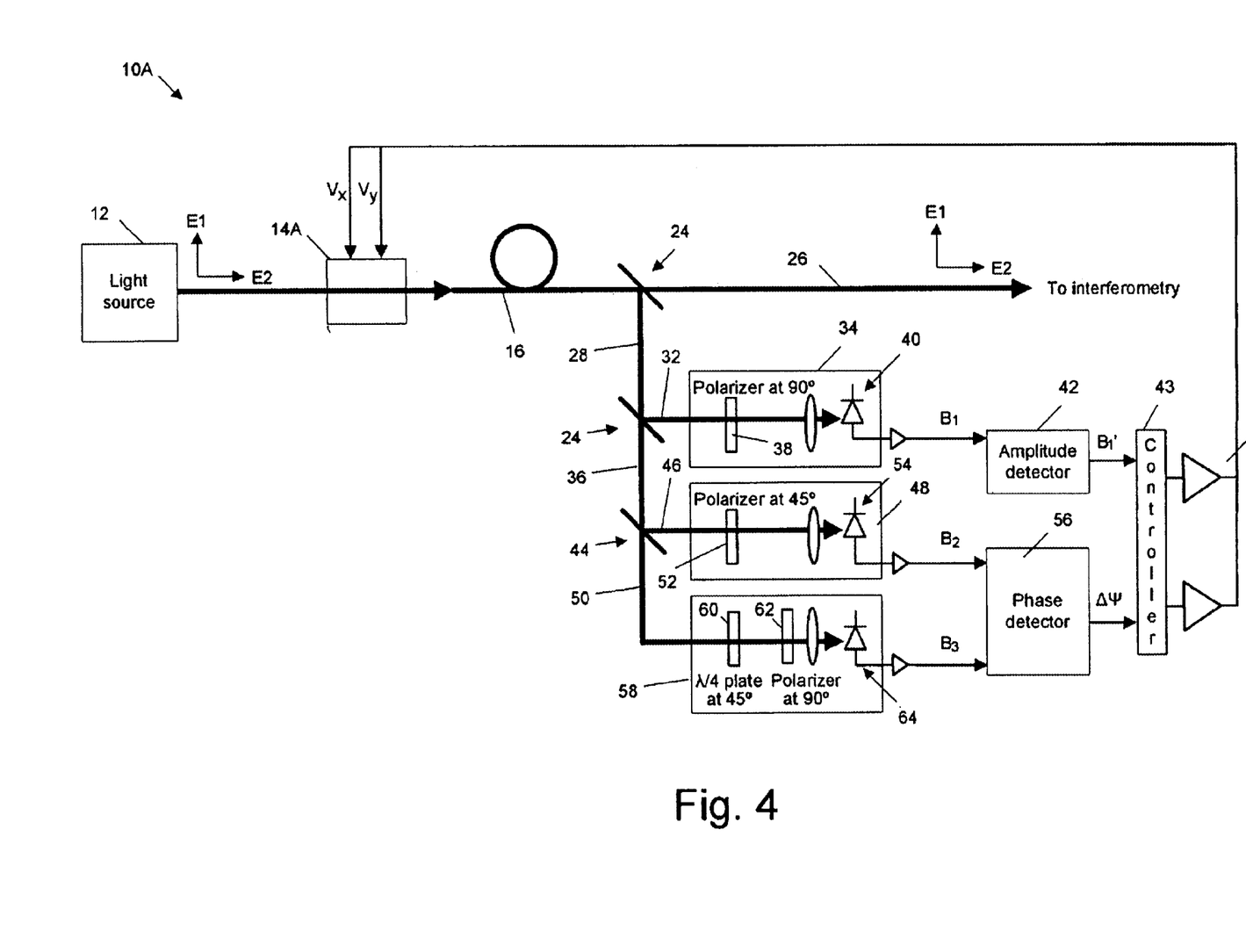
FIG. 4 illustrates a polarization control system for maintaining the polarization states of two orthogonal linearly polarized light beams in one embodiment of the invention.

FIG. 4 illustrates one implementation of system 10 in FIG. 1, hereafter system 10A, which is applicable to a specific orientation of the polarization states in one embodiment of the invention. In system 10A, light source 12 generates a vertically linearly polarized (VLP) E1 and a horizontally linearly polarized (HLP) E2. In system 10A, it is desired to maintain the polarization states of E1 and E2 at the output of fiber 16. Thus, polarizer 38 is oriented at 90°, polarizer 52 is oriented at 45°, wave plate 60 is selected to be a quarter-wave plate oriented at 45°, and polarizer 62 is oriented at 90°.

Figure 5:
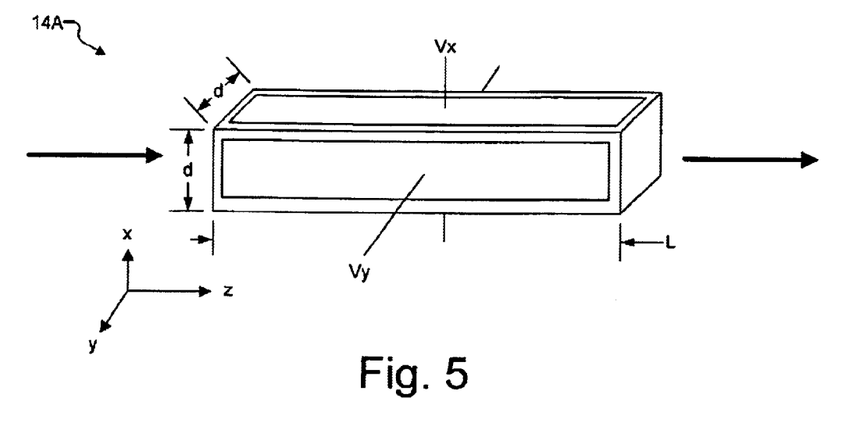
FIG. 5 illustrates a polarization state modulator in the polarization control system of FIG. 4.

FIG. 5 illustrates one embodiment of a PSM 14A used to adjust the polarization states of E1 and E2 in system 10A (FIG. 4). PSM 14A is a rotatable variable retarder made of an electro-optic crystal, such as lithium niobate crystal (LiNbO$_3$), with light propagation in the z-direction and voltages applied in the x and y-directions. The polarization axes and retardance of the LiNbO3 are controlled by changing voltages $V_x$ and $V_y$ so that any input polarization state can be transformed into any output polarization state if both $V_x$ and $V_y$ operate over a range $[-V_\pi, V_\pi]$, where the half-wave voltage $V_\pi = \lambda d/(2n_0^3 r_{22} L)$, $\lambda$ is the wavelength of the light beam, d is the width and height of the LiNbO$_3$, $n_0$ is the ordinary index of the LiNbO$_3$, and $r_{22}$ is the electro-optical coefficient of the LiNbO$_3$.

In one embodiment, system 10A can use a method similar to method 100 (FIGS. 2 and 3) to maintain the desired polarization states of E1 and E2. Controller 43 first performs a global search to find initial values of voltages $V_x$ and $V_y$ that produce a desired phase difference $\Delta\Psi_0$. Controller 43 then performs a minimum search continuously to lock onto the minimum corresponding to the desired phase difference $\Delta\Psi_0$.

When a PM fiber is used in the systems described above, E1 and E2 typically undergo a small polarization change (e.g., less than 20% power change through the polarizer). Thus, there may not be a need for a PSM that can generate all the possible input polarization states in order to find and lock to the desired output polarization states. In fact, a proper design can reduce the range of polarization states that needs to be searched, thereby allowing the elimination of some variable retarders and possibly the quadrature detection. For example, only polarization states covering half of the Poincare sphere (a mathematical construction which describes all polarization states) may need to be searched.

Figure 6A:
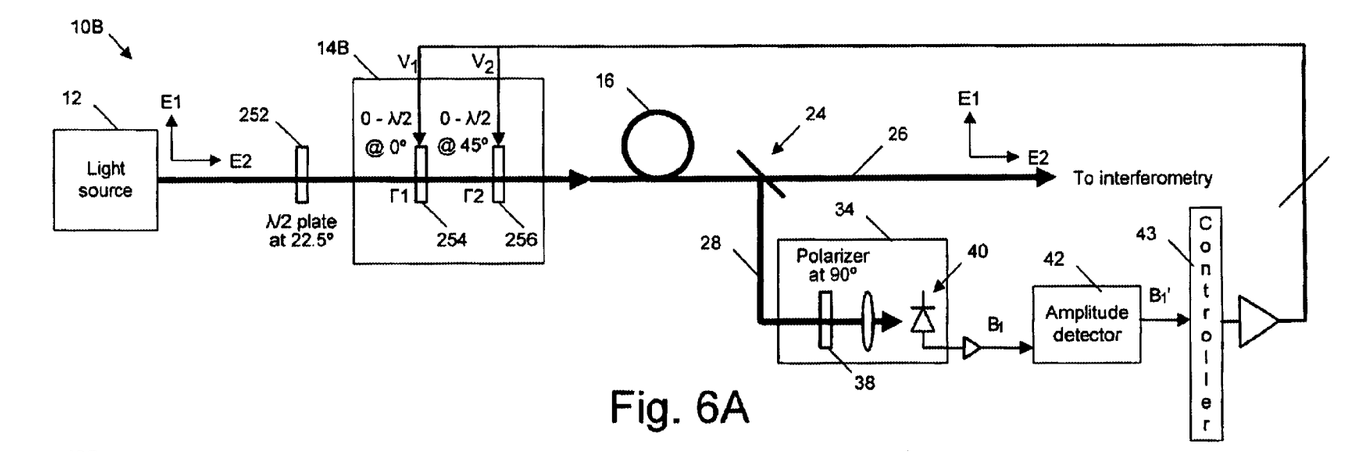
FIGS. 6A, 6B, 6C, and 6D illustrate polarization control systems for maintaining the polarization states of two orthogonal linearly polarized light beams in embodiments of the invention.

FIG. 6A illustrates one implementation of system 10 in FIG. 1, hereafter system 10B, which is applicable to small changes in the polarization states in one embodiment of the invention. In system 10B, light source 12 generates a VLP E1 and a HLP E2. In system 10B, it is desired to maintain the polarization states of E1 and E2 at the output of fiber 16.

A retarder 252 and a PSM 14B are used to produce a subset of the possible polarization states of E1 and E2. Retarder 252 is a half-wave plate oriented at 22.5°. PSM 14B includes (1) a variable retarder 254 oriented at 0° and having a variable retardance that ranges from 0 to λ/2, and (2) a variable retarder 256 oriented at 45° and having a variable retardance that ranges from 0 to λ/2. Retarder 252 and PSM 14B allow approximately half of the Poincare sphere to be searched so system 10B will lock onto only one of the two minimums of beat tone amplitude B1', since the other solution is excluded by design. Furthermore, retarder 252 and PSM 14B allow polarization states to be scanned continuously without any breaks within the region of interest (e.g., half the Poincare sphere) that would otherwise require one or more additional variable retarders to provide endless (i.e., reset-free) polarization control.

System 10B includes only one detector path, i.e., the first detector path 34 that generates beat signal B1. Controller 43 uses only beat signal B1 to lock onto the only minimum within the input polarization states that can be produced by PSM 14B. No global search for an initial solution is needed as only one minimum is accessible within the input polarization states that can be produced by retarder plate 252 and PSM 14B.

Figure 6B:
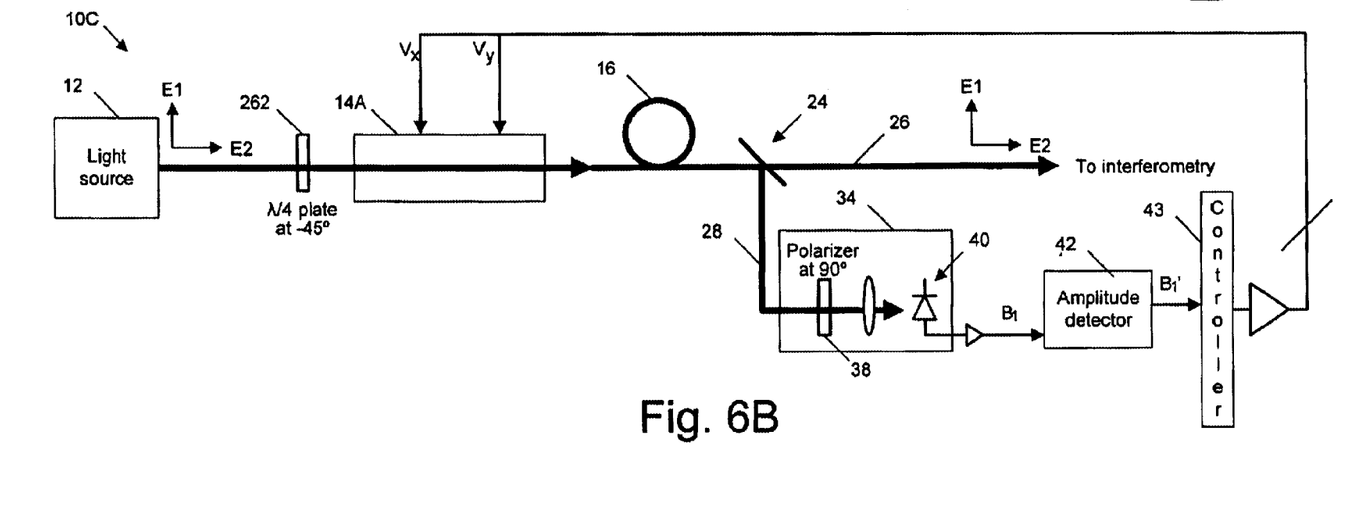

FIG. 6B illustrates a system 10C similar to system 10B except for a different retarder and a different PSM in one embodiment of the invention. System 10C includes a quarter-wave plate 262 oriented at −45° and PSM 14A (FIG. 5). As described above, PSM 14A is a rotatable variable retarder controlled by voltages $V_x$ and $V_y$, wherein voltage $V_x$ operates over a range $[0, V_\pi]$ and voltage $V_y$ operates over a range $[-V_\pi, V_\pi]$. Retarder 262 and PSM 14A allow approximately half of the Poincare sphere to be searched continuously without any breaks in the polarization states that would otherwise require one or more additional rotatable variable retarders to provide endless polarization control.

Figure 6C:
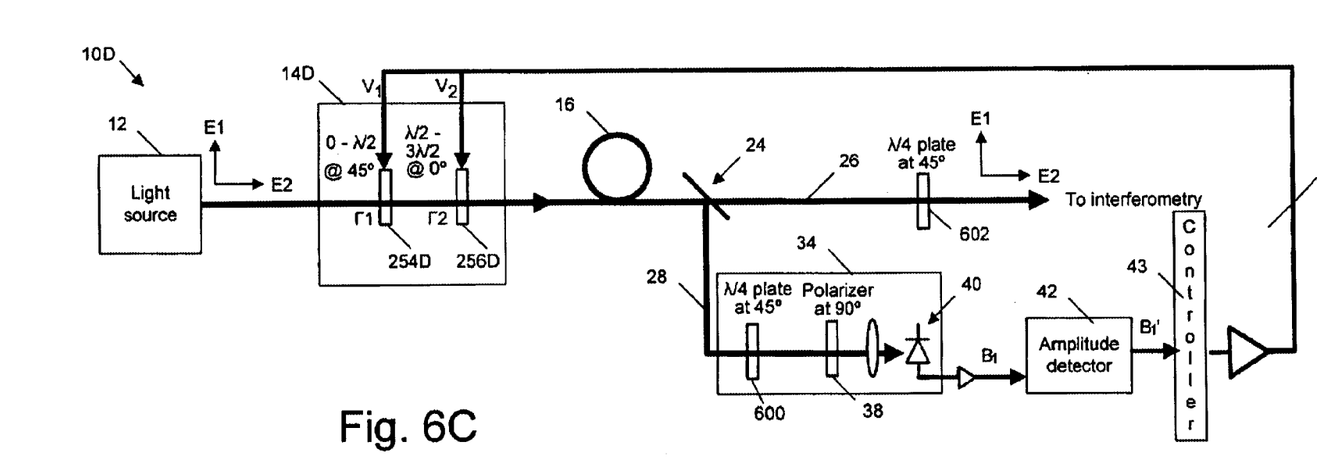

While the desired polarization states for heterodyne interferometry typically correspond to a VLP E1 and HLP E2, it is possible to design a system that locks E1 and E2 to polarization states other than VLP and HLP while still obtaining VLP and HLP states before E1 and E2 enter the interferometer. FIG. 6C illustrates such a system 10D in one embodiment of the invention. System 10D is similar to systems 10B and 10C except for modifications described below. The input polarization states are a VLP E1 and a HLP E2. Retarder 252 (FIG. 6A) and retarder 262 (FIG. 6B) are not used in system 10D. PSM 14D includes (1) a variable retarder 254D oriented at 45° and operating over a retardance range of 0 to λ/2, and (2) a variable retarder 256D oriented at 0° and operating over a retardance range of λ/2 to 3λ/2. A quarter-wave plate 600 oriented at 45° is included in detector path 34 before polarizer 38 so that the minimum beat amplitude corresponds to a left circular polarization (LCP) state E1 and a right circular polarization (RCP) state E2. A second quarter-wave plate 602 oriented at 45° is included in path 26 to convert the LCP E1 and RCP E2 to a VLP E1 and a HLP E2 before they enter the interferometer.

Figure 6D:
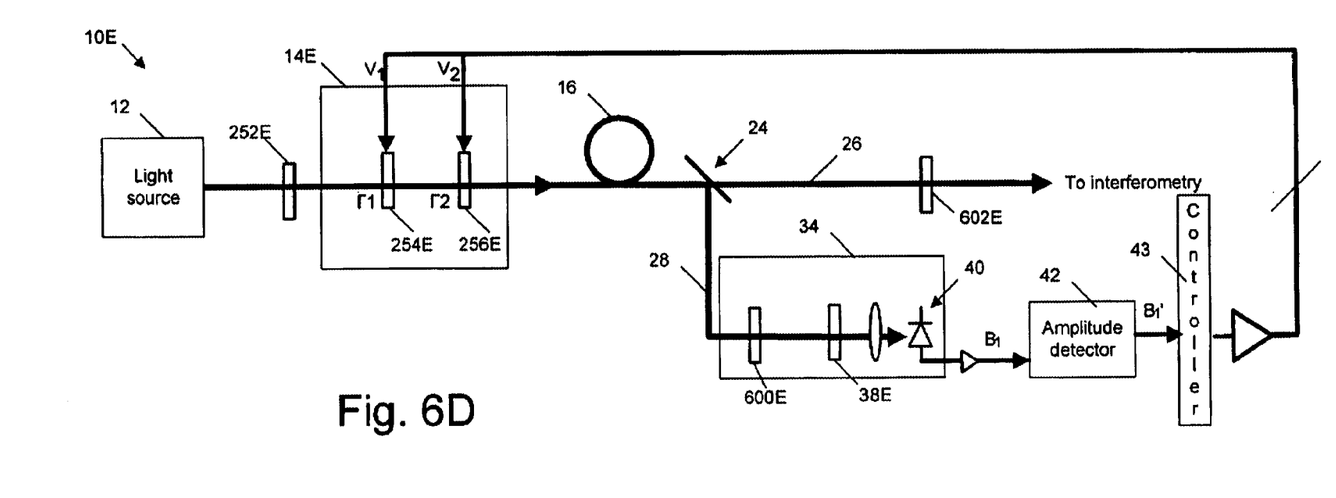

FIG. 6D illustrates a system 10E, which combines the features of system 10B and system 10D, in one embodiment of the invention. In system 10E, light source 12 generates a E1 and a E2 with polarization states depending on the application. Similar to system 10B, a retarder 252E and a PSM 14E are used to produce a subset of the possible polarization states of E1 and E2. The retardance and orientation of retarder 252E depend on the input polarization states and the desired output polarization states of E1 and E2. Similar to system 10D, a retarder 600E is included in detector path 34 before polarizer 38 so that the minimum beat amplitude corresponds to the desired polarization states of E1 and E2. A retarder 602E is included in path 26 to convert E1 and E2 to the desired polarization states before they enter the interferometer. Again, the retardance and the orientation of retarder 602E depend on the desired polarization states of E1 and E2.

Figure 7:
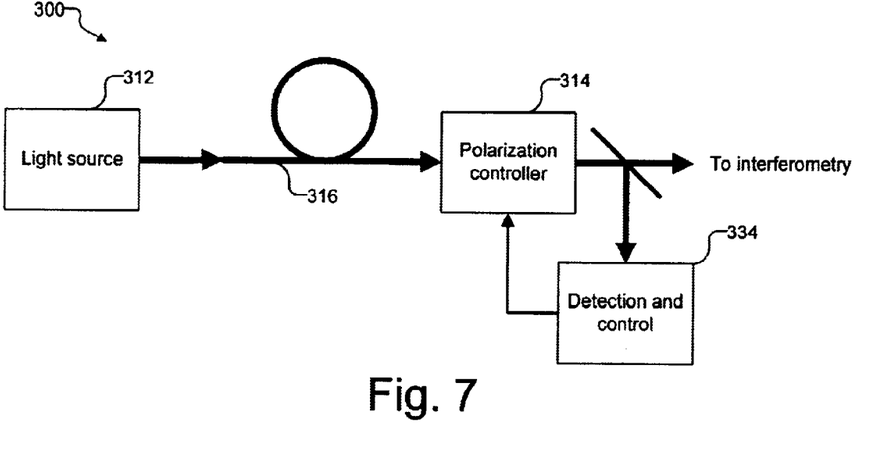
FIG. 7 illustrates a non-remote configuration of a polarization control system in one embodiment of the invention.

The various embodiments of the polarization control system described above have all been shown in a remote operation configuration, where the PSM is located upstream from the fiber and the measurement site. FIG. 7 illustrates one embodiment of a non-remote polarization control system 300 where a PSM 314 is located downstream from a fiber 316 at the measurement site. As can be seen, a light source 312 launches two light beams with orthogonal polarization states and different frequencies into fiber 316. Fiber 316 then carries the two light beams to PSM 314. PSM 314 adjusts the polarization states of the two light beams before sending them to an output path and a monitor path. PSM 314 can be implemented as described above in FIGS. 1, 4, 5, 6A and 6B. The output path leads to an interferometry system for measuring displacement. The monitor path leads to a detection and control block 334 that generates the feedback control to PSM 314 to maintain the desired output polarization states of the two light beams. Block 334 can be implemented as described in FIGS. 1, 4, 6A, and 6B.

Figure 8:
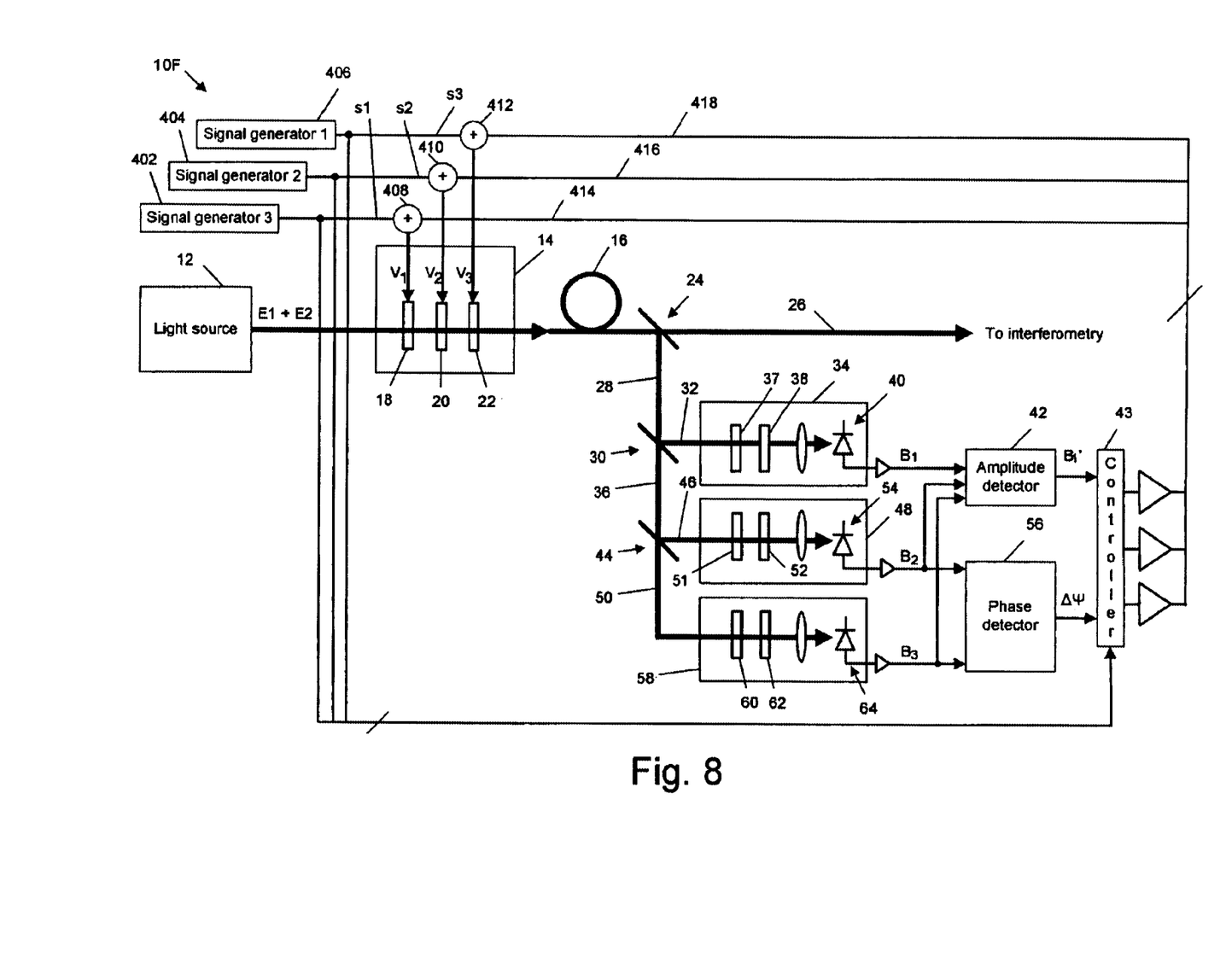
FIG. 8 illustrates a polarization control system using dithering to maintain any polarized states of two orthogonal light beams in one embodiment of the invention.

FIG. 8 illustrates one implementation of system 10 in FIG. 1, hereafter system 10F, which locks onto the desired beat tone amplitude B1' using dithering. The technique of dithering generates small modulation terms to each control signal in order to aid the detection of the derivative of the detected signal (including sign). This technique also filters out changes in amplitude detected by amplitude-sensing device 42 due to other factors such as mechanical vibration and temperature variation. System 10F is similar to system 10 except with the addition of signal generators 402, 404, and 406, and adders 408, 410, and 412. Signal generators 402, 404, and 406 generate small orthogonal modulation signals s1, s2, s3 (which could be sinusoidal at frequencies f1, f2, and f3). Controller 43 detects signals s1, s2, s3 and generates three signals 414, 416, and 418 using correlation techniques, which are added to corresponding control dither signals s1, s2, and s3 to generate control signals V1, V2, and V3 to variable retarders 18, 20, and 22, respectively.

Various other adaptations and combinations of features of the embodiments disclosed are within the scope of the invention. Note also that the desired output polarization states do not need to be the same as the input polarization states emerging from the light source. For example, one embodiment of system 10B in FIG. 6A can be used for input polarization states corresponding to a left circularly polarized E1 and a right circularly polarized E2 from the laser, and for generating desired output polarization states corresponding to a VLP E1 and a HLP E2. In such an embodiment, retarder 252 would be a quarter-wave plate oriented at 90°. Similarly, one embodiment of system 10C in FIG. 6B can be used for input polarization states corresponding to a left circularly polarized E1 and a right circularly polarized E2 from the laser, and for generating desired output polarization states corresponding to a VLP E1 and a HLP E2. In such an embodiment, retarder 262 would not be needed.

Although various embodiments of the PSM have been described above, additional embodiments of the PSM can be used. One embodiment of the PSM includes two or more fiber squeezers whose birefringence properties are varied by the application of mechanical stresses. Mechanical stresses are applied to the fiber squeezers in response to the control signals from controller 43. Another embodiment of PSM includes two or more liquid crystal cells whose retardances and/or polarization axes are varied in response to the control signals from controller 43. Yet another embodiment of PSM includes two or more mechanically rotatable wave plates with fixed retardance. The wave plates are rotated in response to the control signals from controller 43. Yet another embodiment of the PSM includes two or more photoelastic modulators whose linear birefringences are induced by the application of mechanical stresses. Mechanical stresses are applied to these photoelastic modulators in response to the control signals form controller 43. Numerous embodiments are encompassed by the following claims.

What is claimed is:

1. A polarization control system for heterodyne interferometry, comprising:

a light source generating a first light beam with a first polarization state and a first frequency, and a second light beam with a second polarization state and a second frequency;

a polarization state modulator (PSM) receiving the first and the second light beams from the light source, the PSM having at least two degrees of polarization control, the PSM changing the first and the second polarization states;

a first detector path receiving the first and the second light beams from the PSM, the first detector path generating a first beat signal in response to the first and the second light beams;

an amplitude detector receiving the first beat signal, the amplitude detector generating a beat amplitude signal; and a controller receiving the beat amplitude signal, the controller generating a plurality of control signals for controlling the at least two degrees of polarization control in response to the beat amplitude signal.

2. The system of claim 1, wherein the PSM is selected from the group consisting of:
at least one liquid crystal cell, wherein at least one of (1) a retardance and (2) polarization axes of the liquid crystal cell vary in response to the plurality of control signals;
at least one fiber squeezer whose birefringence properties vary in response to mechanical stresses applied in response to the plurality of control signals;
at least one electro-optic crystal, wherein at least one of (1) a retardance and (2) polarization axes of the electro-optic crystal vary in response to the plurality of control signals;
at least one mechanically rotatable wave plates with fixed retardances whose polarization axes are rotated in response to the plurality of control signals; and
at least one photoelastic modulators whose linear birefringence properties are induced by mechanical stresses applied in response to the plurality of control signals.

3. The system of claim 1, further comprising at least one retarder between the light source and the PSM, the retarder changing the first and the second polarization states.

4. The system of claim 3, wherein:
the first light beam is a substantially vertically linearly polarized light;
the second light beam is a substantially horizontally linearly polarized light;
the retarder is a half-wave plate oriented substantially at 22.50°; and the PSM comprises:
  a first variable retarder oriented substantially at 0° and having a variable retardance from approximately 0 to $\lambda/2$; and
  a second variable retarder oriented substantially at 45° and having a variable retardance from approximately 0 to $\lambda/2$.

5. The system of claim 3, wherein:
the first light beam is a substantially left circularly polarized light;
the second light beam is a substantially right circularly polarized light;
the retarder is a quarter-wave plate oriented substantially at 90°; and
the PSM comprises:
  a first variable retarder oriented substantially at 0° and having a variable retardance from approximately 0 to $\lambda/2$; and
  a second variable retarder oriented substantially at 45° and having a variable retardance from approximately 0 to $\lambda/2$.

6. The system of claim 3, wherein:
the first light beam is a substantially vertically linearly polarized light;
the second light beam is a substantially horizontally linearly polarized light;
the retarder is a quarter-wave plate oriented substantially at −45°; and
the PSM comprises a rotatable variable retarder comprising an electro-optic crystal receiving a first voltage in the x-axis and a second voltage in the y-axis, wherein the light propagates along the z-axis.

7. The system of claim 1, wherein:
the first light beam is a substantially left circularly polarized light;
the second light beam is a substantially right circularly polarized light; and
the PSM comprises a rotatable variable retarder comprising an electro-optic crystal receiving a first voltage in the x-axis and a second voltage in the y-axis, wherein the light propagates along the z-axis.

8. The system of claim 1, wherein the first detector path comprises:
a polarizer receiving the first and the second light beams; and
a light detector receiving the first and the second light beams from the polarizer, the light detector generating the first beat signal in response to the first and the second light beams.

9. The system of claim 3, wherein the first detector path comprises:
a polarizer receiving the first and the second light beams; and
a light detector receiving the first and the second light beams from the polarizer, the light detector generating the first beat signal in response to the first and the second light beams.

10. The system of claim 9, further comprising at least one retarder before the polarizer, the at least one retarder changing the first and the second polarization states.

11. The system of claim 8, further comprising at least one retarder before the polarizer, the at least one retarder changing the first and the second polarization states.

12. The system of claim 11, further comprising:
a beam splitter splitting the first and the second light beams from the PSM into an output path and a monitor path, wherein the first detector path receives the first and the second light beams from the monitor path; and
at least one retarder after the beam splitter in the output path, the at least one retarder changing the first and the second polarization states.

13. The system of claim 8, further comprising:
a beam splitter splitting the first and the second light beams from the PSM into an output path and a monitor path, wherein the first detector path receives the first and the second light beams from the monitor path; and
at least one retarder after the beam splitter in the output path, the at least one retarder changing the first and the second polarization states.

14. The system of claim 9, further comprising:
a beam splitter splitting the first and the second light beams from the PSM into an output path and a monitor path, wherein the first detector path receives the first and the second light beams from the monitor path; and
at least one retarder after the beam splitter in the output path, the at least one retarder changing the first and the second polarization states.

15. The system of claim 10, further comprising:
a beam splitter splitting the first and the second light beams from the PSM into an output path and a monitor path, wherein the first detector path receives the first and the second light beams from the monitor path; and
at least one retarder after the beam splitter in the output path, the at least one retarder changing the first and the second polarization states.

16. The control system of claim 1, further comprising:
a first beam splitter splitting the first and the second light beams from the PSM into an output path and a first monitor path;
a second beam splitter receiving the first and the second light beams from the first monitor path, the second beam splitter splitting the first and the second light beams into a second monitor path and a third monitor path, wherein the first detector path receives the first and the second light beams from the second monitor path;
a third beam splitter receiving the first and the second light beams from the third monitor path, the third beam splitter splitting the first and the second light beams into a fourth monitor path and a fifth monitor path;
a second detector path receiving the first and the second light beams from the fourth monitor path, the second detector path generating a second beat signal in response to the first and the second light beams;
a third detector path receiving the first and the second light beams from the fifth monitor path, the third detector path generating a third beat signal in response to the first and the second light beams;
a phase detector receiving the second and the third beat signals, the phase detector generating a phase signal in response to the second and the third beat signals; and
wherein the controller receives the phase signal and further generates the plurality of control signals in response to phase signal.

17. The system of claim 16, wherein:
the first detector path comprises:
   a first polarizer receiving the first and the second light beams and transmitting a third light beam;
   a first light detector receiving the third light beam from the first polarizer, the first light detector generating the first beat signal in response to the third light beam;
the second detector path comprising:
   a second polarizer receiving the first and the second light beams and transmitting a fourth light beam;
   a second light detector receiving the fourth light beam and a generating the second beat signal in response to the fourth light beam;
the third detector path comprising:
   a third polarizer receiving the first and the second light beams and transmitting a fifth light beam;
   a third light detector receiving the fifth light beam and generating the third beat signal in response to the fifth light beam.

18. The system of claim 17, wherein at least one of the first, second, and third detector paths includes at least one retarder before their respective polarizers.

19. The system of claim 18, further comprising at least one retarder between the light source and the PSM, the retarder changing the first and the second polarization states.

20. The system of claim 18, further comprising:
a beam splitter splitting the first and the second light beams from the PSM into an output path and a monitor path, wherein the first detector path receives the first and the second light beams from the monitor path; and
at least one retarder after the beam splitter in the output path, the at least one retarder changing the first and the second polarization states.

21. The system of claim 19, further comprising:
a beam splitter splitting the first and the second light beams from the PSM into an output path and a monitor path, wherein the first detector path receives the first and the second light beams from the monitor path; and
at least one retarder after the beam splitter in the output path, the at least one retarder changing the first and the second polarization states.

22. The system of claim 17, wherein the PSM is selected from the group consisting of:
at least one liquid crystal cell, wherein at least one of (1) a retardance and (2) polarization axes of the liquid crystal cell vary in response to the plurality of control signals;
at least one fiber squeezer whose birefringence properties vary in response to mechanical stresses applied in response to the plurality of control signals;
at least one electra-optic crystal, wherein at least one of (1) a retardance and (2) polarization axes of the electro-optic crystal vary in response to the plurality of control signals;
at least one mechanically rotatable wave plates with fixed retardances whose polarization axes are rotated in response to the plurality of control signals; and
at least one photoelastic modulators whose linear birefringence properties are induced by mechanical stresses applied in response to the plurality of control signals.

23. The system of claim 17, wherein the PSM comprises:
a first retarder at a first orientation, the first retarder receiving a first control signal to change a first retardance;
a second retarder at a second orientation, the second retarder receiving a second control signal to change a second retardance; and
a third retarder at a third orientation, the third retarder receiving a third control signal to change a third retardance.

24. The system of claim 23, further comprising:
a first signal generator generating a first modulation signal;
a first adder receiving the first modulation signal and a fourth control signal from the controller, the first adder generating the first control signal in response to the first modulation signal and the fourth control signal;
a second signal generator generating a second modulation signal;
a second adder receiving the second modulation signal and a fifth control signal from the controller, the second adder generating the second control signal in response to the second modulation signal and the fifth control signal;
a third signal generator generating a third modulation signal;
a third adder receiving the third modulation signal and a sixth control signal from the controller, the third adder generating the third control signal in response to the third modulation signal and the sixth control signal;
wherein:
   the controller receives the first, the second, and the third modulation signals;

the controller generates the plurality of control signals further in response to the first, the second, and the third modulation signals; and the fourth, the fifth, and the sixth control signals comprise the plurality of control signals.

25. The system of claim 1, wherein the first light beam and the second light beam are each selected from the group consisting of a vertically polarized light beam, a horizontally linearly polarized light beam, a right circularly polarized light beam, a left circularly polarized light beam, and an elliptically polarized light beam.

26. The system of claim 1, further comprising a fiber receiving the first and the second light beams from the PSM, the fiber carrying the first and the second light beams to a site where interferometry measurements are taken and where said amplitude detector is located.

27. The system of claim 1, further comprising a fiber receiving the first and the second light beams from the light source, the fiber carrying the first and the second light beams to the PSM at a site where interferometry measurements are taken.

28. A method for maintaining polarization states of light beams from a fiber in a heterodyne interferometry system, comprising:

generating a first light beam and a second light beam, the first light beam having a first polarization state and a first frequency, the second light beam having a second polarization state and a second frequency;

adjusting at least two degrees of polarization control to change the first and the second polarization state;

splitting the first and the second light beams into a first path and a second path;

generating a first beat signal in response to the first and the second light beams in the first path; and generating a beat amplitude signal in response to the first beat signal; and generating a plurality of control signals for controlling the at least two degrees of polarization control in response to the beat amplitude signal.

29. The method of claim 28, further comprising:

splitting the first and the second light beams from the second path into a third path and a fourth path;

generating a second beat signal in response to the first and the second light beams from the third path;

generating a third beat signal in response to the first and the second light beams from the fourth path;

generating a phase difference signal in response to the second and the third beat signals; and wherein said generating the plurality of control signals is further in response to the phase signal.

30. The method of claim 29, further comprising:

prior to said generating a first beat signal, passing the first and the second light beam from the first path through a polarizer;

prior to said generating a second beat signal, passing the first and the second light beams from the third path through a polarizer; and prior to said generating a third beat signal, passing the first and the second light beams from the fourth path through a wave plate and then through a polarizer.

31. The method of claim 28, wherein said generating the plurality of control signals comprises selecting initial values of the control signals, said selecting initial values comprises:

recording the phase signal generated by varying the control signals to generate a plurality of retardances; and selecting values of the control signals that generate a desired phased difference.

32. The method of claim 31, wherein said generating the plurality of control signals further comprises varying the control signals to achieve a minimum value of the beat amplitude signal.

33. The method of claim 28, wherein the first and the second light beams are selected from the group consisting of (1) a vertical linearly polarized light and a horizontally linearly polarized light, and (2) a left circularly polarized light and a right circularly polarized light.

34. The method of claim 29, wherein in said generating the control signals comprises:
  generating orthogonal modulation signals;
  adding the orthogonal modulations signals and the plurality of control signals to generate a second plurality of control signals for adjusting the at least two degrees of polarization control; and
said generating of the plurality of control signals is further in response to the orthogonal modulation signals.

35. The method of claim 28, further comprising carrying the first and the second light beams in a fiber from where said adjusting at least two degrees of polarization control to a site where interferometry measurements are taken and where said generating a beat amplitude signal occurs.

36. The method of claim 28, further comprising carrying the first and the second light beams in a fiber from where said generating a first light beam and a second light beam occurs to where said adjusting at least two degrees of polarization control, said adjusting at least two degrees of polarization control occurring at a site where interferometry measurements are taken.

37. The method of claim 28, further comprises:

generating orthogonal modulation signals;

adding the orthogonal modulation signals and the plurality of control signals to generate a second plurality of control signals for adjusting the at least two degrees of polarization control; and wherein said generating the plurality of control signals is further in response to the orthogonal modulation signals.

* * * * *

UNITED STATES PATENT AND TRADEMARK OFFICE
CERTIFICATE OF CORRECTION

PATENT NO. : 6,961,129 B2
DATED : November 1, 2005
INVENTOR(S) : Joanne Y. Law, Eric S. Johnson and Elizabeth A. Nevis It is certified that error appears in the above-identified patent and that said Letters Patent is hereby corrected as shown below:

Column 9,
Line 30, "wave plates with fixed" should read -- wave plate with a fixed --.
Line 31, "retardances" should read -- retardance --.
Line 33, "one photoelastic modulators" should read -- "one photoelastic modulator --.

Column 11,
Line 9, "The control system" should read -- The system --.
Line 37, "response to phase signal" should read -- response to the phase signal --.
Line 51, "and a generating" should read -- and generating --.

Column 12,
Line 28, "wave plates with fixed" should read -- wave plate with a fixed --.
Line 29, "retardances" should read -- retardance --.
Line 31, "one phtoelastic modulators" should read -- one photoelastic modulator --.

Column 13,
Line 55, "and the second light beam" should read -- and the second light beams --.

Column 14,
Line 14, "desired phased difference" should read -- desired phase difference --.

Signed and Sealed this

Twenty-eighth Day of February, 2006

JON W. DUDAS
*Director of the United States Patent and Trademark Office*